US011867383B2

(12) United States Patent
Schmuckle et al.

(10) Patent No.: US 11,867,383 B2
(45) **Date of Patent: *Jan. 9, 2024**

(54) OUTDOOR LANDSCAPE LIGHT

(71) Applicant: Hunter Industries, Inc., San Marcos, CA (US)

(72) Inventors: Darrin I. Schmuckle, Vista, CA (US); Jesus Moreno, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,882

(22) Filed: Dec. 12, 2022

(65) Prior Publication Data

US 2023/0113724 A1 Apr. 13, 2023

Related U.S. Application Data

(63) Continuation of application No. 17/070,827, filed on Oct. 14, 2020, now Pat. No. 11,525,558.

(51) Int. Cl.

| | |
|---|---|
| ***F21V 17/06*** | (2006.01) |
| ***F21S 8/00*** | (2006.01) |
| ***F21V 33/00*** | (2006.01) |
| *F21V 14/06* | (2006.01) |
| *F21W 131/10* | (2006.01) |

(52) U.S. Cl.

CPC .............. *F21V 17/06* (2013.01); *F21S 8/032* (2013.01); *F21V 33/006* (2013.01); *F21V 14/06* (2013.01); *F21W 2131/10* (2013.01)

(58) Field of Classification Search

CPC ........... F21S 8/032; F21S 8/036; F21V 17/06; F21V 14/06; F21W 2131/10

See application file for complete search history.

(56) References Cited

U.S. PATENT DOCUMENTS

| | | | | |
|---|---|---|---|---|
| 5,810,468 | A | 9/1998 | Shimada | |
| 7,104,662 | B2 | 9/2006 | Kawanishi | |
| 8,390,207 | B2 | 3/2013 | Dowling | |
| 8,419,205 | B1 | 4/2013 | Schmuckle | |
| 8,672,502 | B2 | 3/2014 | Hartman | |
| 8,714,767 | B2 | 5/2014 | Sears | |
| 8,783,916 | B2 | 7/2014 | Tyson | |
| 9,213,361 | B1 | 12/2015 | Urban | |
| 11,525,558 | B2 * | 12/2022 | Schmuckle | F21V 33/006 |
| 2001/0026455 | A1 | 10/2001 | Stidham et al. | |
| 2010/0008090 | A1 | 1/2010 | Li et al. | |
| 2010/0284173 | A1 | 11/2010 | Verjans | |
| 2011/0063849 | A1 | 3/2011 | Alexander | |
| 2012/0051068 | A1 | 3/2012 | Pelton | |
| 2012/0236547 | A1 | 9/2012 | Hartman | |
| 2013/0063946 | A1 | 3/2013 | Preuschl | |
| 2014/0313775 | A1 | 10/2014 | Myers | |
| 2017/0038056 | A1 | 2/2017 | Joiris | |
| 2019/0101256 | A1 | 4/2019 | Hartman | |
| 2020/0103099 | A1 | 4/2020 | Schmuckle | |

* cited by examiner

*Primary Examiner* — Julie A Bannan

(74) *Attorney, Agent, or Firm* — KNOBBE, MARTENS OLSON & BEAR LLP

(57) ABSTRACT

Disclosed is an outdoor light fixture assembly having a housing and a lens module. The lens module is removable from the housing for servicing. The removable lens module includes a socket for one or more light sources and a lens. The outdoor light fixture further includes engagement structures for installing and removing the lens module from the housing without the use of tools.

20 Claims, 8 Drawing Sheets

OUTDOOR LANDSCAPE LIGHT

CROSS-REFERENCE TO RELATED APPLICATION

This application is a continuation application of U.S. patent application Ser. No. 17/070,827, filed Oct. 14, 2020, and entitled "OUTDOOR LANDSCAPE LIGHT." The entire contents of the above application is hereby incorporated by reference and made a part of this specification. Any and all priority claims identified in the Application Data Sheet, or any correction thereto, are hereby incorporated by reference under 37 CFR § 1.57.

BACKGROUND

Field

This invention relates to lights, and more particularly, relates to outdoor light fixture assemblies.

Description of the Related Art

Outdoor lighting is frequently used in gardens, yards, landscapes, walkways, steps, and building exteriors to provide visibility, security, and/or aesthetics. Common types of outdoor light fixtures include path lights, wall lights, tree lights, deck lights, well lights, step lights, and rope lights. The outdoor light fixture will include a light source mounted within the light fixture. A cover will be separately mounted to the light fixture and over the light source to protect the light source from weather. Replacement of the light source will require at least removal of the cover to gain access to the light source. Once the cover is removed, the light source can be removed from the light fixture. This process is further complicated when the orientation of the installed light fixture limits access. Thus, it would be desirable to simplify replacement of the light source.

SUMMARY

In a first aspect, an outdoor light fixture assembly is configured to be supported by a step or cap via a mounting plate. The light fixture assembly comprises a housing configured to be support by the mounting plate, the housing having a first engagement structure and forming a receptacle having an opening; and a user serviceable lens module being sized and shaped to transition between a installed position and a removed position relative to the housing. The user serviceable lens module is disposed in the receptacle and covering the opening so as to restrict water from entering the receptacle through the opening when in the installed position. The user serviceable lens module supports a socket, a lens, and a second engagement structure at least when in the removed position. The socket has a power wire and at least one contact for electrically connecting to one or more light sources. The socket is disposed relative to the user serviceable lens module such that the at least one contact is accessible from inside the user serviceable lens module and at least a portion of the power wire is disposed outside the user serviceable lens module. The power wire is configured to electrically connect with a source of electric power. The lens is positioned so that light emitted by the one or more light sources exits the receptacle through the lens. The second engagement structure is complementary to the first engagement structure so as to allow the user serviceable lens module to be transitioned from the installed position to the removed position.

In a second aspect, an outdoor light fixture assembly comprises a housing having a first engagement structure and forming a receptacle having an opening; and a lens module sized and shaped to transition between an installed position and a removed position relative to the housing, the lens module being disposed in the receptacle and covering the opening so as to restrict water from entering the receptacle through the opening when in the installed position. The lens module comprises a socket having a power wire and at least one contact for electrically connecting to one or more light sources, the socket being disposed relative to the lens module such that the at least one contact is accessible from inside the lens module and at least a portion of the power wire is disposed outside the lens module, the power wire being configured to electrically connect with a source of electric power, a lens positioned so that light emitted by the one or more light sources exits the receptacle through the lens, and a second engagement structure complementary to the first engagement structure so as to allow the lens module to be transitioned from an installed position to a removed position.

In a third aspect, an outdoor light fixture assembly comprises a housing having a first engagement structure and forming a receptacle having an opening; and a lens module sized and shaped to transition between an installed position and a removed position relative to the receptacle. The lens module comprises a socket having at least one contact for electrically connecting to one or more light sources, a lens positioned so that light emitted by the one or more light sources exits the receptacle through the lens, and a second engagement structure configured to engage with the first engagement structure when the lens module is in the installed position.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

DETAILED DESCRIPTION

The following detailed description is directed to certain specific embodiments. The invention(s) disclosed herein, however, can be embodied in a multitude of different ways as defined and covered by the claims. In this description, reference is made to the drawings, wherein like parts are designated with like numerals throughout. The features, aspects and advantages of the present invention will now be described with reference to the drawings of several embodiments that are intended to be within the scope of the development herein disclosed. These and other embodiments will become readily apparent to those skilled in the art from the following detailed description of the embodiments having reference to the attached figures, the invention not being limited to any particular embodiment(s) herein disclosed.

Figure 1:
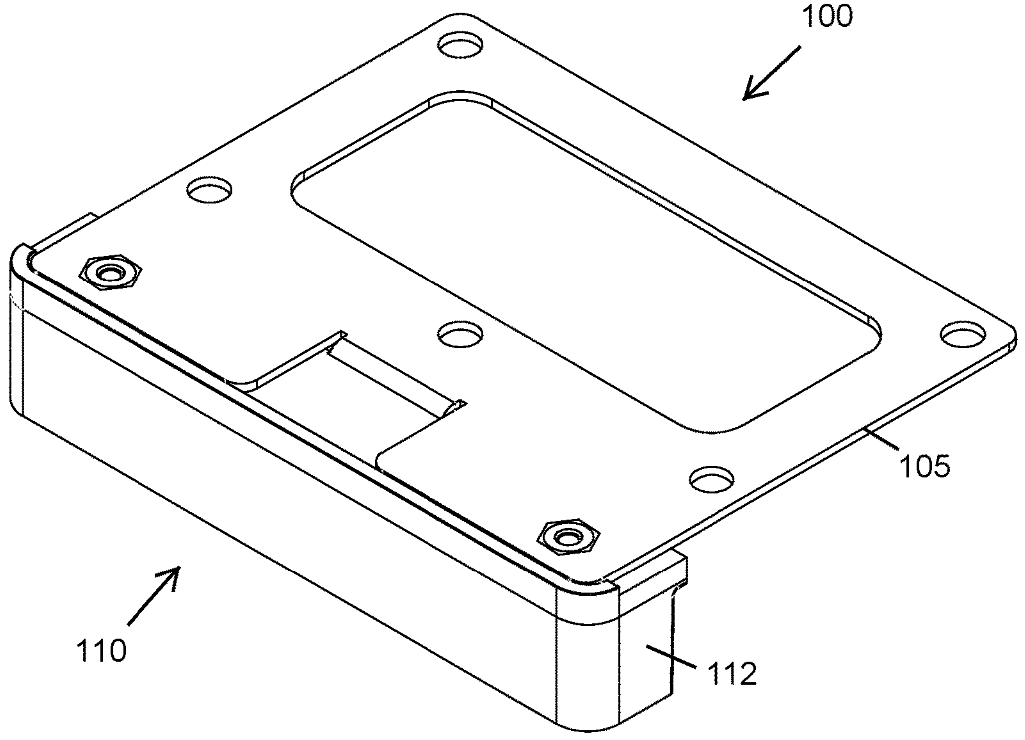
FIG. 1 is a front, top side perspective view of a light assembly according to a preferred embodiment of the present invention.

FIG. 1 illustrates an embodiment of a light assembly 100. The light assembly 100 can be secured within a light installation to emit light towards a desired area or surface. In certain embodiments, the light assembly 100 can include a mounting plate 105 and a light fixture assembly 110.

Figure 2:
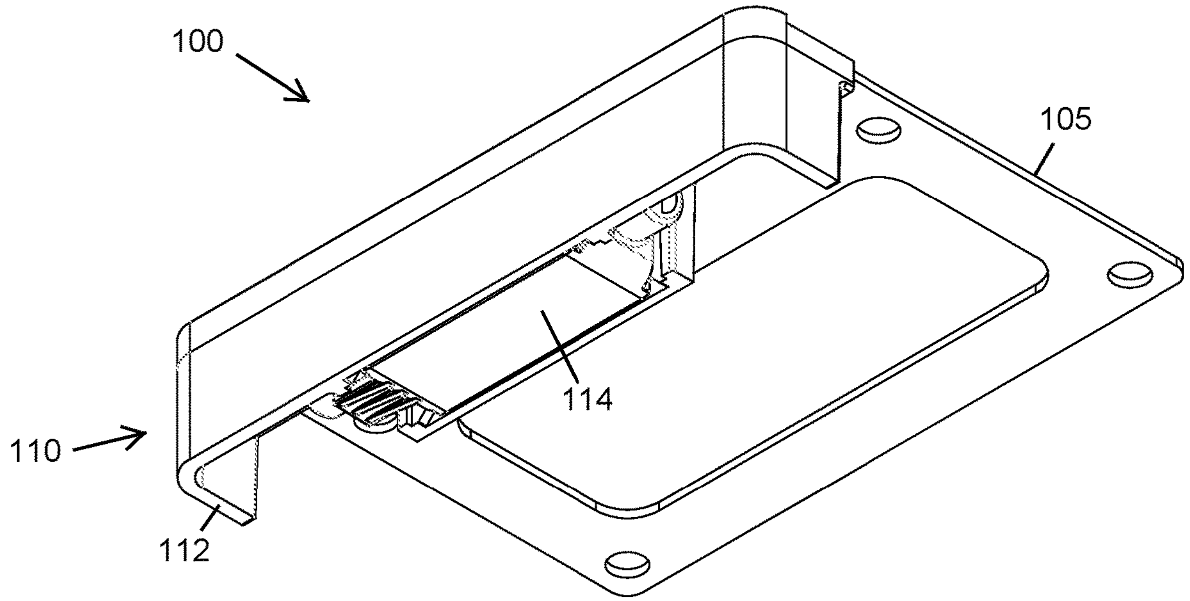
FIG. 2 is a front, bottom side perspective view of the light assembly from FIG. 1 and shows a light fixture assembly coupled to a mounting plate.
Figure 4:
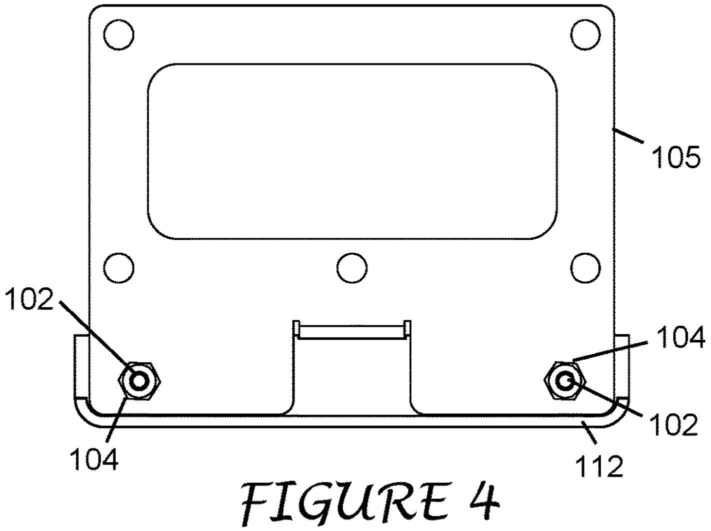
FIG. 4 is a top view of the light assembly from FIG. 3.
Figure 3:
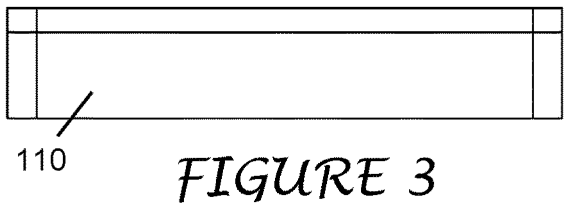
FIG. 3 is a front view of the light assembly from FIG. 1.

FIG. 2 is a front, bottom side perspective view of the light assembly 100 from FIG. 1 and shows the light fixture assembly 110 coupled to the mounting plate 105. FIG. 3 is a front view of the light assembly 100 from FIG. 1. FIG. 4 is a top view of the light assembly 100 from FIG. 3. The light fixture assembly 110 can be configured to emit light in one or more directions exterior to the light fixture assembly 110.

Figure 5:
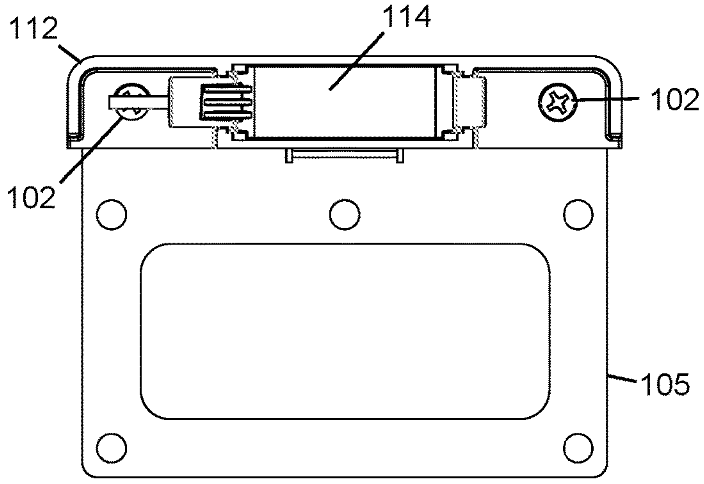
FIG. 5 is a bottom view of the light assembly from FIG. 3 and shows a removable lens module of the light fixture assembly.

FIG. 5 is a bottom view of the light assembly 100 from FIG. 3 and shows a removable lens module 114 of the light fixture assembly 110. In certain embodiments, the light fixture assembly 110 can include a housing 112 and the lens module 114.

Figure 6:
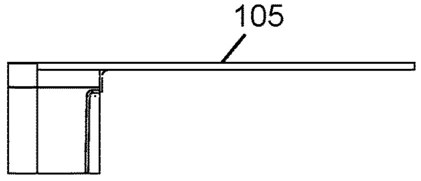
FIG. 6 is a right side view of the light assembly from FIG. 3.

FIG. 6 is a right side view of the light assembly 100 from FIG. 3. The light fixture assembly 110 can be used in the landscaping with or without the mounting plate 105. In embodiments where the light fixture assembly 110 is employed with the mounting plate 105, the housing 112 can be coupled to the mounting plate 105 before or after the mounting plate 105 is installed into the landscaping. The mounting plate 105 can be attached to a surface or structure within the landscaping. For example, the mounting plate 105 can be installed first into the landscaping. Once installed, the housing 112, with or without the lens module 114, can be attached to the installed mounting plate 105. If the lens module 114 was not coupled to the housing 112 when the housing was attached to the mounting plate 105, the user can simply install the lens module 114 to the housing 112. Because of the modular design of the lens module 114 and its ease of installation, the level of effort installing the lens module 114 in an already installed housing 112 does not appreciably increase the complexity of installing the light assembly 100 into the landscaping.

Figure 7:
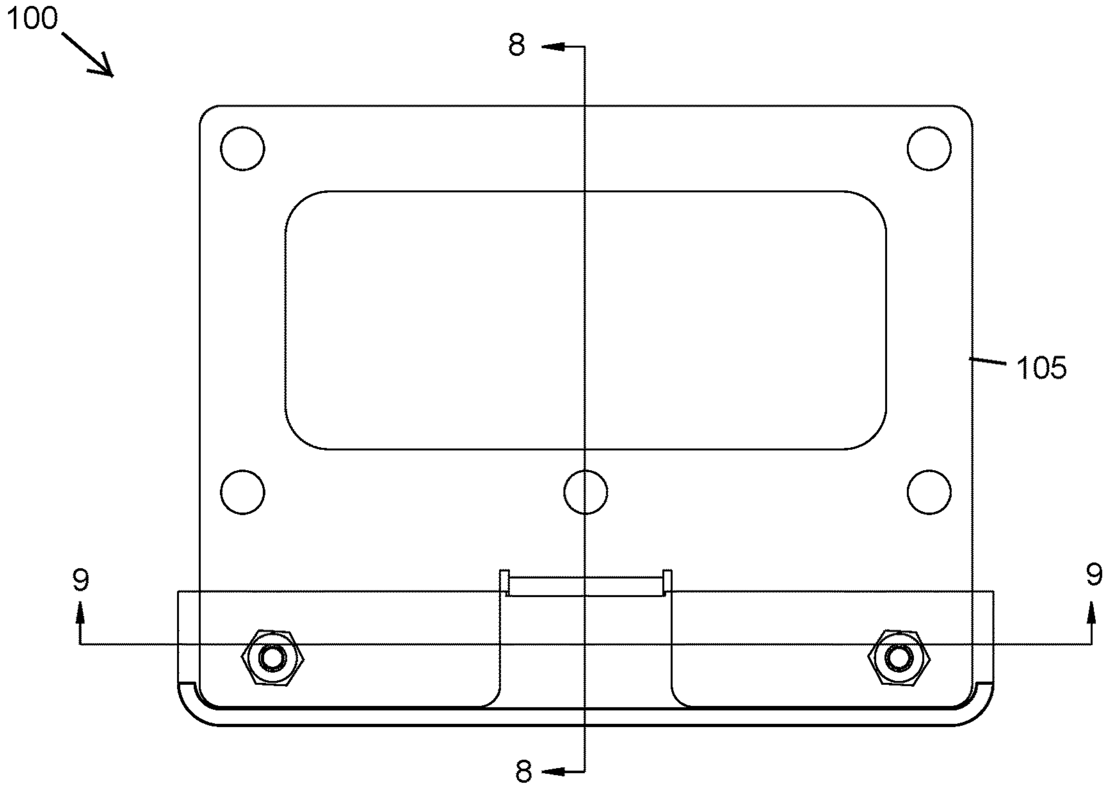
FIG. 7 is a top view of the light assembly from FIG. 1.
Figure 8:
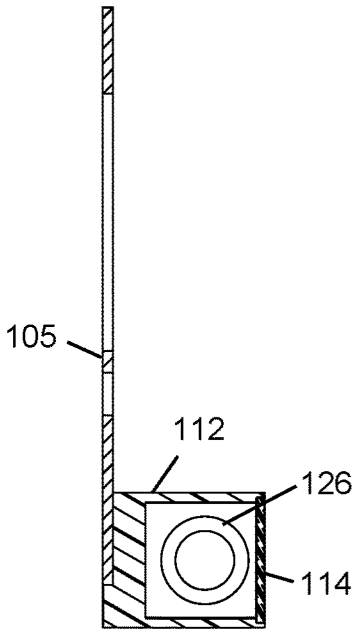
FIG. 8 is a cross-sectional view of the light assembly of FIG. 7 taken along line 8-8 as depicted in FIG. 7.

FIG. 7 is a top view of the light assembly 100 from FIG. 1. FIG. 8 is a cross-sectional view of the light assembly 100 of FIG. 7 taken along line 8-8 as depicted in FIG. 7. In certain embodiments, the lens module 114 can be configured to emit light in one or more directions exterior to the housing 112. In certain embodiments, the lens module 114 is user serviceable by allowing a user to service individual components of the lens module 114.

Figure 9:
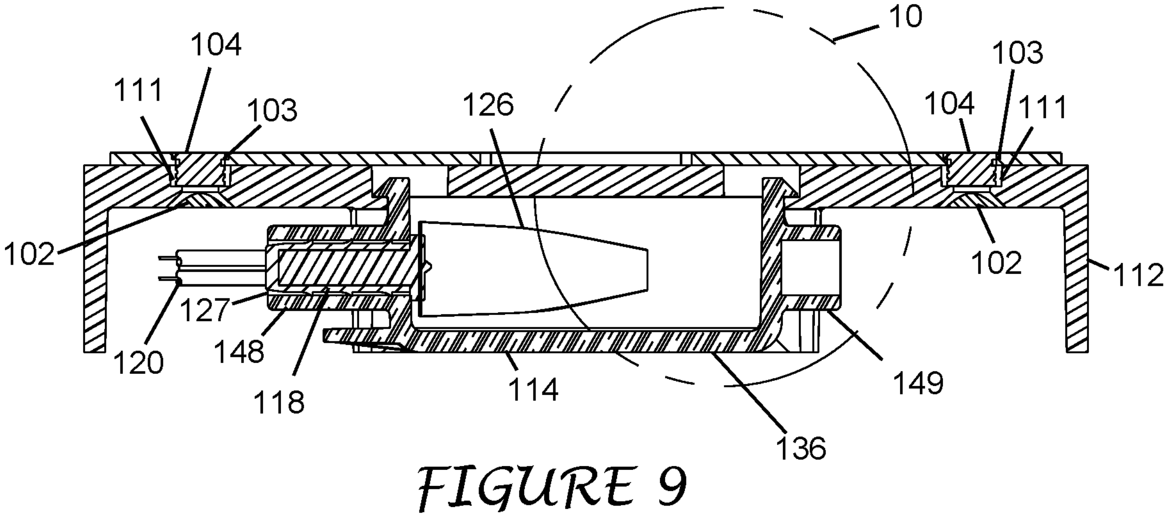
FIG. 9 is a cross-sectional view of the light assembly of FIG. 7 taken along line 9-9 as depicted in FIG. 7 and shows the lens module secured to a housing.

FIG. 9 is a cross-sectional view of the light assembly 100 of FIG. 7 taken along line 9-9 as depicted in FIG. 7 and shows the lens module 114 secured to the housing 112. In certain embodiments, the lens module 114 includes one or more light sources 126, a lens 136, and a socket 118 having a power wire 120. For example, in certain embodiments, the power wire 120 can be coupled to the socket 118 with the socket 118 being coupled to the lens 136. The one or more light sources 126 can be plugged into or removed from the socket 118 by the user.

In certain embodiments, the light assembly 100 can include one or more fasteners 102. In certain embodiments, the light fixture assembly 110 can be releasably secured to the mounting plate 105 by the one or more fasteners 102. In certain embodiments, the fasteners 102 can include screws, bolts, nuts, or any other suitable fasteners. In certain embodiments, the light fixture assembly 110 can be supported in an installation via the mounting plate 105. For example, in certain embodiments, the light fixture assembly 110 can be supported by a step or a cap via the mounting plate 105.

As shown in FIGS. 8 and 9, the mounting plate 105 can include a plurality of apertures 103 for receiving the fasteners 102. In certain embodiments in which the fasteners 102 are nuts, the apertures 103 can receive complementary fasteners configured to secure to the fasteners 102. In some embodiments, a self-clinching stud can be installed in the aperture 103.

As most clearly shown in FIG. 9, the housing 112 can include a plurality of apertures 111 for receiving the fasteners 102. In certain embodiments in which the fasteners 102 are screws, the apertures 111 can receive complementary fasteners 104 configured to secure to the fasteners 102. In some embodiments, the complementary fasteners 104 can be self-clinching nuts. The apertures 111 can be configured to align with the apertures 103 when the housing 112 is secured to the mounting plate 105 to allow the complementary fasteners 104 to extend through both the apertures 103 and 111.

Figure 10:
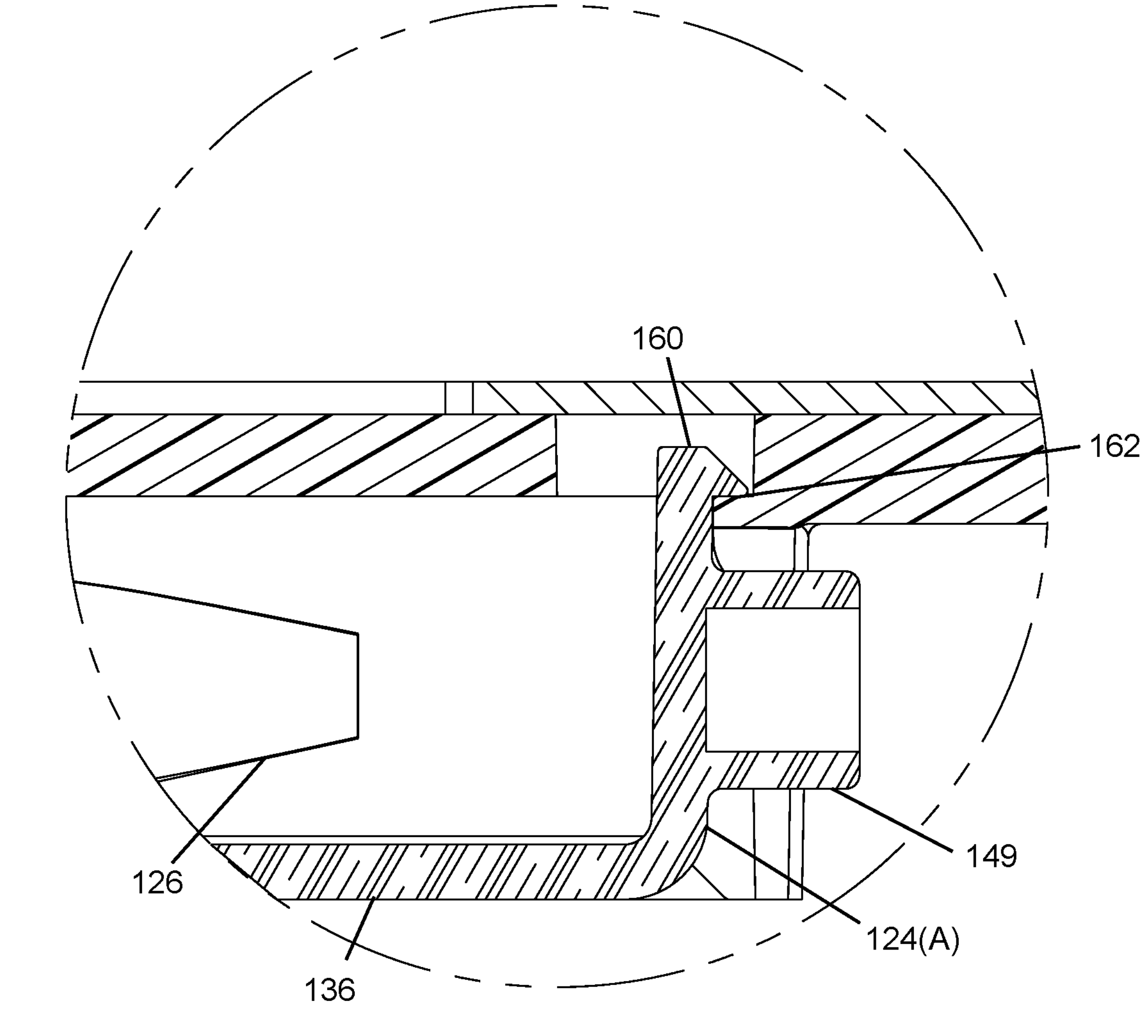
FIG. 10 is an enlarged view of a portion of FIG. 9 and shows engagement structures for releasably coupling the lens module to the housing.

FIG. 10 is an enlarged view of a portion of FIG. 9 and shows engagement structures for releasably coupling the lens module 114 to the housing 112. In certain embodiments, the lens module 114 includes a first engagement structure 160 and the housing 112 include a second engagement structure 162. The first engagement structure 160 and the second engagement structure 162 are complementary. For example, the user can remove the lens module 114 from the housing 112 by disengaging the first engagement structure 160 from the second engagement structure 162.

Figure 11:
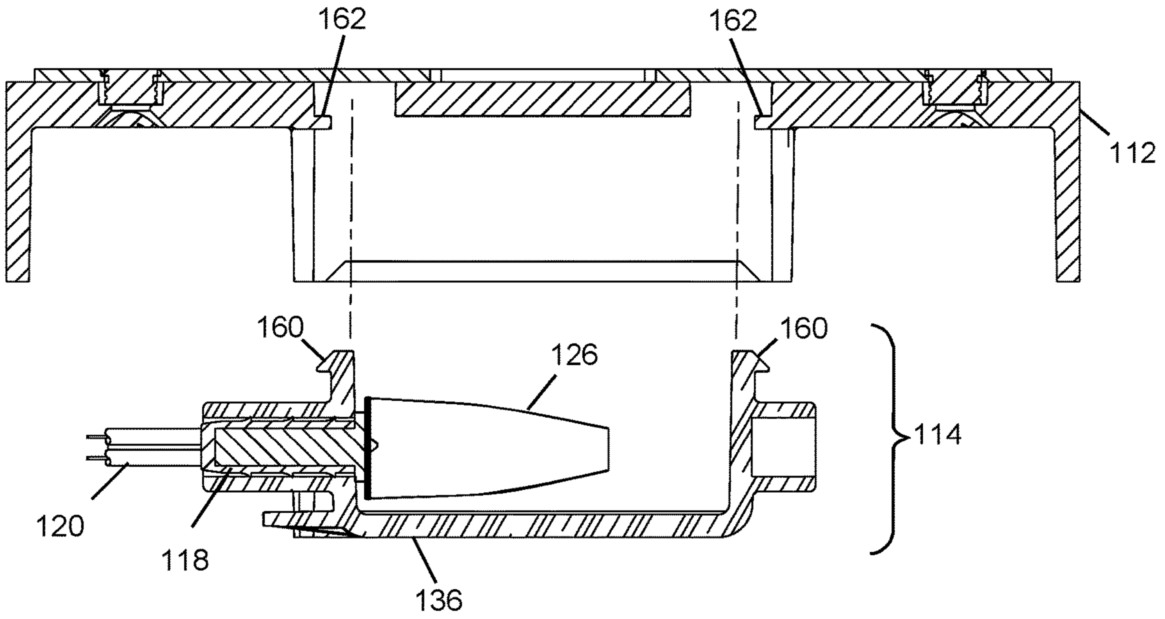
FIG. 11 is similar to FIG. 10 except shows the lens module removed from the housing.
Figure 12:
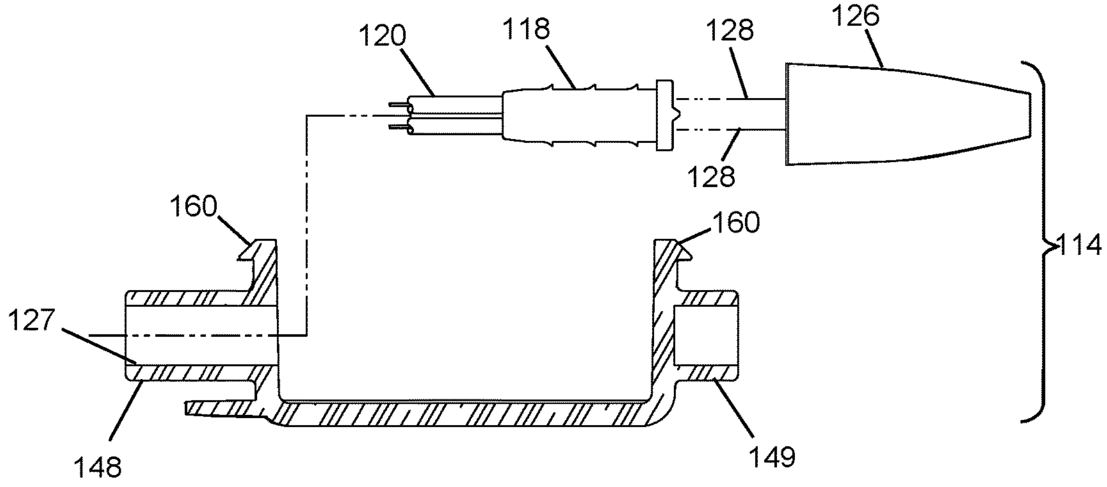
FIG. 12 is similar to FIG. 11 except shows one or more light sources and a socket removed from the lens module.

FIG. 11 is similar to FIG. 10 except shows the lens module 114 removed from the housing 112. FIG. 12 is similar to FIG. 11 except shows one or more light sources 126 and the socket 118 removed from the lens module 114.

As shown in FIG. 11, the first engagement structure 160 has been disengaged from the second engagement structure 162. In certain embodiments, the first engagement structure 160 is integral to the lens module 114 and the second engagement structure 162 is integral to the housing 112. In embodiments in which the first and second engagement structures 160, 162 are integral, there is no risk of losing any fasteners during assembly and disassembly of the lens module 114.

One or more individual components of the lens module 114 can be disassembled and reassembled by a user servicing the lens module 114. In this way, the user can remove the lens module 114 from the housing 112 and then subsequently disassemble the lens module 114 to remove, replace, and/or add one or more individual components from/to the lens module 114.

The user can disassemble an embodiment of the lens module 114 that has a first combination of one or more components and then reassemble that same lens module 114 using a second combination of one or more components. For example, the second combination can generally be the same as the first combination except that one or more individual components of the first combination have been switched out for similar components but having different optical characteristics such as color.

Once the service is complete by the user selecting and assembling the desired one or more individual components into the lens module 114, the user then inserts the assembled lens module 114 into the housing 112 as an assembly. In this way, the user can service the lens module 114 and service individual components of the lens module 114.

In certain embodiments, the user can disengage the lens module 114 from the housing 112 without the use of tools. For example, in certain embodiments, the user can pinch at least one end of the lens module 114 with their fingers to disengage the first engagement structure 160 from the second engagement structure 162. In some embodiments, a boss 149 can be formed on the lens module 114. In some embodiments, the boss 149 can aid the user in pinching at least one end of the lens module 114. In this way, the user can simply remove the lens module 114 by hand to replace the one or more light sources 126. In certain embodiments, no further disassembly of the light fixture assembly 110 is required to replace the one or more light sources 126.

As shown in FIG. 11, when the lens module 114 is in the removed position, the lens module 114 is engaged with the power wire 120. In some embodiments, the lens module 114 can be installed as shown in FIGS. 9 and 11. In some embodiments, the orientation of the lens module 114 can be reversed so the power wires 120 protrude from the light fixture assembly 110 on the opposite side than is shown. In some embodiments, the lens module 114 can be installed in either position which allows the user to select from which direction they want the power wire 120 to extend from the light fixture assembly 110.

Figure 13:
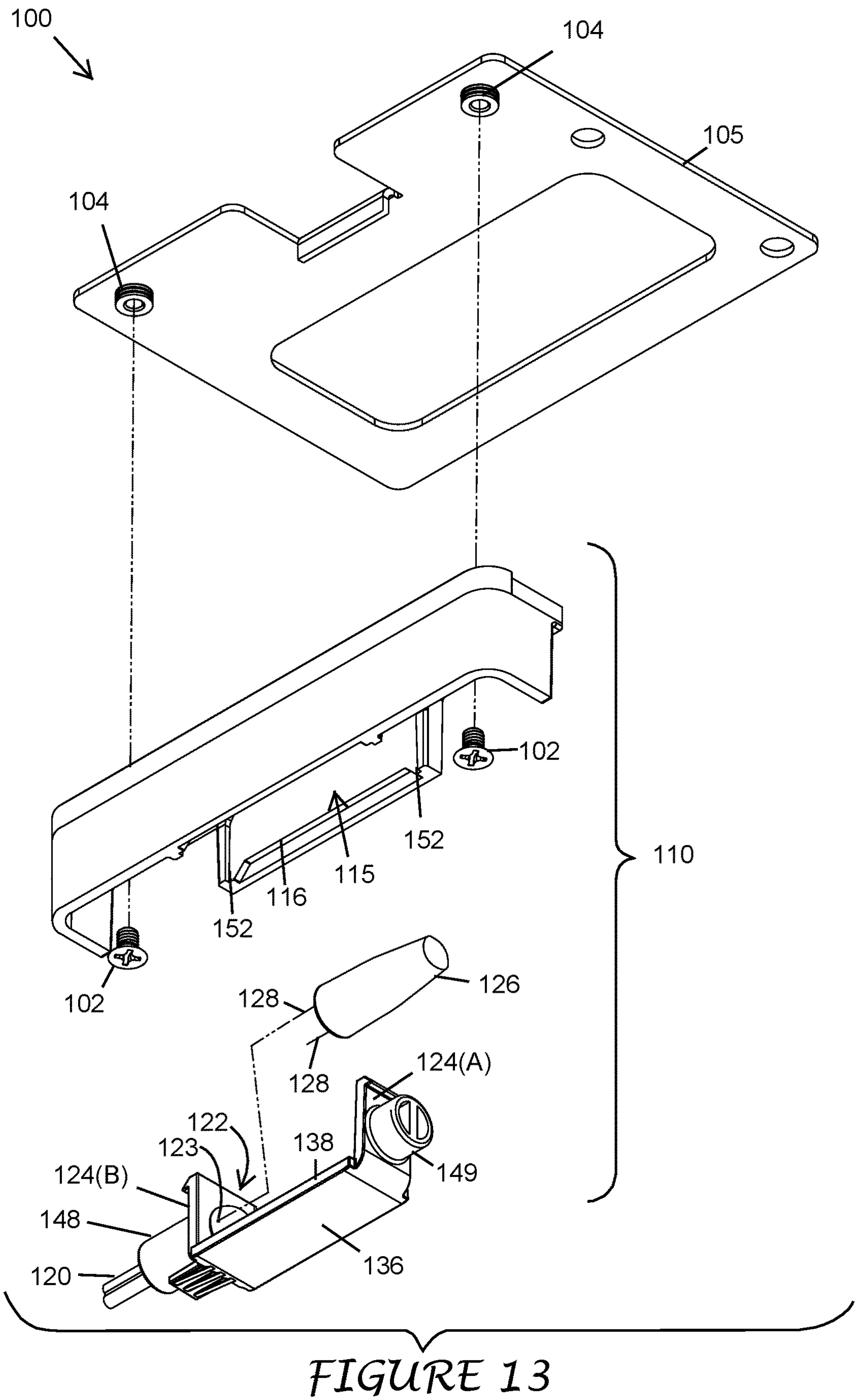
FIG. 13 is an exploded perspective view of the light assembly of FIG. 2.

FIG. 13 is an exploded perspective view of the light assembly 100 of FIG. 2. In certain embodiments, the housing 112 can be formed of one or more plastics. In certain embodiments, the housing 112 can be formed of one or more metals. In certain embodiments, the housing 112 can be created with a 3D printer. In certain embodiments, the housing 112 can be formed of cast aluminum. In certain embodiments, the housing 112 can be formed of cast brass.

As explained above, in certain embodiments, the lens module 114 includes the socket 118 having the power wire 120. In certain embodiments, the power wire 120 is configured to electrically connect with a source of electrical power. In certain embodiments, the socket 118 is configured to transfer power from the power wire 120 to the one or more light sources 126.

As shown in FIG. 13, the housing 112 can form a receptacle 115. In certain embodiments, the receptacle 115 can be configured to receive at least a portion of the lens module 114. In certain embodiments, the receptacle 115 includes an opening 116 configured to receive at least a portion of the lens module 114. In certain embodiments, the lens module 114 can be sized, shaped, and/or otherwise configured to be received in the opening 116.

In certain embodiments, the receptacle 115 is a channel having a U-shape when the lens module 114 is removed from the housing 112. The shape of the receptacle 115 is not limited to a U-shape channel and can have other shapes. For example, in certain embodiments, the receptacle 115 can have a rectangular or oval shape.

In the illustrated embodiments, the opening 116 of the receptacle 115 extends to include both ends of the receptacle 115. In other embodiments, the opening 116 can have other shapes. For example, the opening 116 can include only one of the two ends of the receptacle 115. In other embodiments, the opening 116 is limited to only one wall of the receptacle 115.

In certain embodiments, the lens module 114 can be sized, shaped, and/or otherwise configured to transition between an installed position and a removed position relative to the housing 112. In certain embodiments, the lens module 114 is configured to transition between the installed and removed positions without the use of tools.

In certain embodiments, the receptacle 115 transitions from an open shape to a closed shape when the lens module 114 is secured to the housing 112. In this way, a shape of the lens module 114 can be complementary to the shape of the opening 116. For example, in certain embodiments, the lens module 114 has a U-shape which is complementary to the U-shape of the receptacle 115.

In certain embodiments, the lens module 114 includes one or more end walls 124(A), 124(B). In the illustrated embodiment, the end walls 124(A), 124(B) are attached to opposite ends of the lens 136 to form the legs of the U-shape. In certain embodiments, the one or more end walls 124(A), 124(B) form a smooth transition with the lens 136.

In certain embodiments, the lens module 114 can be disposed in the receptacle 115 and cover the opening 116 so as to inhibit or prevent water or other weather from entering the housing 112 through the opening 116 when in the installed position. In certain embodiments, the lens module 114 seals against edges of the opening 116 when the lens module 114 is installed in the receptacle 115. In some embodiments, the lens module 114 can restrict water from entering the housing 112 so that no water, or only a small amount of water can enter the housing 112 when in the installed position. In some embodiments, the lens module 112 can allow any water that may enter the housing 112 to escape between the lens module 114 and the housing 112.

In certain embodiments, the lens module 114 can be configured to receive the socket 118 having the power wire 120. In certain embodiments, the socket 118 is sized, shaped, or otherwise configured such that the power wire 120 is disposed outside of the housing 112 when the socket 118 is received within the receptacle 115. In certain embodiments, the lens module 114 includes a channel 127 configured to receive the socket 118 (see FIG. 12). In certain embodiments, the lens module 114 can receive the socket 118 such that the power wire 120 is disposed outside of the housing 112. In the illustrated embodiment, the channel 127 receives the socket 118 with the power wire 120 extending through the channel 127 and outside the receptacle 115.

In certain embodiments, the socket 118 includes two power wires 120. In other embodiments, a single power wire 120 or three or more power wires 120 are employed. For example, in certain embodiments, the socket 118 can include one, two, three, four, or any other suitable number of power wires 120.

In certain embodiments, a plurality of power wires 120 are bonded or otherwise bound together in a single cable. In the illustrated embodiment, two power wires are bonded together to form a single cable. In certain embodiments, the power wire 120 can be an insulated wire having an insulating jacket. In certain embodiments, the power wire 120 is a plurality of insulated power wires with their insulating jackets bonded together. In certain embodiments, the insulated wires are bonded together to form a zip-cord.

In certain embodiments, the socket 118 includes one or more channels 123 (see FIG. 13). The embodiment of the socket 118 illustrated in FIG. 13 includes two channels 123. In certain embodiments, the socket 118 further includes one or more contacts 122. The one or more contacts 122 can be sized, shaped, positioned, or otherwise configured within the one or more channels 123 to engage one or more pins 128 of the one or more light modules 126. In certain embodiments, the one or more light modules 126 can include two, three, four, or any other suitable number of pins 128. The one or more contacts 122 of the socket 118 can include two, three, four, or any other suitable number of contacts. In certain embodiments, the one or more contacts 122 are sleeves configured to receive the one or more pins 128. In the illustrated embodiment, the one or more contacts 122 are recessed in the one or more channels 123. In certain embodiments, the one or more contacts 122 can releasably couple with the one or more light sources 126 when one or more pins 128 of the one or more light sources 126 are inserted into the one or more channels 123. The one or more contacts 122 can provide electrical power to the one or more light sources 126. In certain embodiments, the channel 127 is sized, shaped, or otherwise configured such that when the socket 118 is disposed within the channel 127, the one or more channels 123 are accessible from inside the lens module 114 for receiving the one or more pins 128 of the one or more light sources 126.

In certain embodiments, the one or more light sources 126 can be one or more light emitting diodes (LEDs), incandescent bulbs, fluorescent bulbs, halogen bulbs, or high intensity discharge bulbs. In embodiments, the one or more light sources 126 are one or more LEDs that emit a single color such as white, red, green, or blue. In other embodiments, the one or more LEDs emit multiple colors such as by employing an array of controlled RGB LEDs. The one or more light sources 126 can be positioned or otherwise configured to emit light in one or more directions exterior to the lens module 114.

When the one or more pins 128 are electrically connected with the one or more contacts 122, electrical power can be supplied to the one or more light sources 126 from the power wire 120.

In certain embodiments, at least a portion of the lens module 114 includes the lens 136. In certain embodiments, the lens 136 can be positioned to allow light from the one or more light sources 126 to project in at least one direction exterior to the light fixture assembly 110. In certain embodiments, the lens 136 can be transparent or substantially transparent. In certain embodiments, the lens 136 can be frosted. In certain embodiments, the lens 136 may be tinted with a color. In certain embodiments, the lens 136 may be tinted with a color to change the color temperature of the light emitting from the light fixture assembly 110. In certain embodiments, the lens 136 can protect the one or more light sources 126 from the outside environment when in the installed position.

In certain embodiments, the lens 136 comprises a mating portion 138. In certain embodiments, the mating portion 138 is configured to form a seal between the mating portion 138 and the opening 116. In certain embodiments, the mating portion 138 inhibits or prevents water or moisture ingress past the lens 136 and into the housing 112 when the lens module 114 is in the installed position. In certain embodiments, the mating portion 138 is an O-ring. In certain embodiments, the mating portion 138 is formed as an integral part of the lens 136. In some embodiments, the mating portion 138 is formed as an integral part of the lens module 114.

In certain embodiments, the lens module 114 and the lens 136 can be formed from the same material. In certain embodiments, the lens module 114 and the lens 136 can be molded as one piece. In certain embodiments, the lens module 114 and the lens 136 can be formed from different materials. In certain embodiments, lens module 114 and the lens 136 can be co-molded. In certain embodiments, lens module 114 and the lens 136 can be insert molded. In certain embodiments, lens module 114 and the lens 136 can be welded together. In certain embodiments, lens module 114 and the lens 136 can be chemically bonded together.

In certain embodiments, the lens module 114 comprises one or more bosses 148, 149. In the illustrated embodiment, the lens module 114 includes two bosses, one each of 148 and 149, extending in opposite directions from the one or more end walls 124(A), 124(B). In the illustrated embodiment, the channel 127 is disposed in the boss 148 extending from the end wall 124(B). In some embodiments, the boss 149 can block or otherwise disperse light emitting from the light source 126.

In certain embodiments, a portion of the opening 116 can align the lens module 114 for assembly with the housing 112. In certain embodiments, the receptacle 115 can include one or more recesses, protrusions, and/or other features positioned, sized, shaped, and/or otherwise configured to engage or guide a particular portion of the lens module 114 to orient or align the lens module 114 with the receptacle 115 in the housing 112. In certain embodiments, the receptacle 115 can include one or more recesses, protrusions, and/or other features positioned, sized, shaped, and/or otherwise configured to prevent or inhibit movement of the lens module 114 in at least one direction when the lens module 114 is engaged with the receptacle 115.

In certain embodiments, the one or more bosses 148, 149 limit movement of the lens module 114 relative to the housing 112. The one or more bosses 148, 149 can confine or maintain alignment of the lens module 114 when the lens module 114 is being moved to the installed position. For example, the one or more bosses 148, 149 can fit within the open ends of the opening 116 in the receptacle 115 while guiding the end walls 124(A), 124(B) into slots 152 in the opening 116. In this way, the open ends of the opening 116 are sized relative to the one or more bosses 148 to facilitate installation of the lens module 114 in the housing 112. In certain embodiments, the end walls 124(A), 124(B) may fit snugly or closely within the slots 152.

In certain embodiments, the open ends of the opening 116 have a tapering shape which helps guide the one or more bosses 148 of the lens module 114 as the lens module 114 is moved to the installed position. For example, the one or more bosses 148 may initially fit loosely within the open ends of the opening 116 and then as the open ends begin to taper and the lens module 114 is further moved toward the installed position, the one or more bosses 148 fit snugly or closely within the open ends.

In certain embodiments, the lens module 114 may be releasably secured to the housing 112. For example, in certain embodiments, the lens module 114 attaches to the housing 112 via snap fit or press fit.

In certain embodiments, the first engagement structure 160 of the lens module 114 releasably engages with the second engagement structure 162 of the housing 112. In the illustrated embodiment, the first engagement structure 160 has a generally rectangular cross-sectional shape from the boss 148 of the lens module 114 to a hook shaped tip or distal end of the first engagement structure 160. Of course, the cross-sectional shape of the first and/or second engagements structures 160, 162 is not limited to the illustrated shapes and can have any other shape or combinations of shapes. In certain embodiments, the first and/or second engagements structures 160, 162 have a circular cross-sectional shape. In certain embodiments, the first and/or second engagements structures 160, 162 have a square cross-sectional shape.

In the illustrated embodiment, the first engagement structure 160 includes one or more hooks and the second engagement structure 162 includes one or more lips. In certain embodiments, the hook of the first engagement structure 160 releasably secures to the lip of the second engagement structure 162. In certain other embodiments, the first engagement structure 160 on the lens module 114 is the lip and the second engagement structure 162 on the housing 112 is the hook.

It will be understood, however, that the engagement structures 160, 162 are not limited to the illustrated embodiment or arrangement and can include any other structures or arrangements that can releasable secure together. In certain embodiments, the first and/or second engagement structures 160, 162 can take a variety of other shapes, such as for example, solid or hollow conical, arrowheads, barbs, spheres, mushroom heads, and other types of outwardly or radially projecting structures. For example, the engagement structures can include a post configured to be inserted into a hole to secure the lens module 114 to the housing 112. In certain embodiments, the post can form a press fit with the hole and/or include a mushroom head having a diameter slightly greater than the hole.

In certain embodiments, the first engagement structure 160 is configured to flex or deflect to allow the hook to pass the lip. In certain embodiments, contact caused by the hook and the lip causes the first engagement structure 160 to flex or deflect away from the lip. Once pass the lip, the first engagement structure 160 at least partially moves back towards its original position and the hook wraps around and contacts the lip of the second engagement structure 162.

In certain embodiments, the first engagement structure 160 and the second engagement structure 162 are complementary. For example, the user can remove the lens module 114 from the housing 112 by disengaging the first engagement structure 160 from the second engagement structure 162. In certain embodiments, the user can disengage the lens module 114 from the housing 112 without the use of tools. For example, in certain embodiments, the user can pinch the end walls 124(A), 124(B) and/or bosses 148 of the lens module 114 with their fingers to disengage the first engagement structure 160 from the second engagement structure 162. In this way, the hooks on the ends of the first engagement structure 160 are illustrated as facing towards each other to allow the user to pinch the end walls 124(A), 124(B) and/or bosses 148, 149 together to disengage the hooks from the lips. In other embodiments where the lips are reversed, the hooks can face away from each other.

In this way, the user can simply remove the lens module 114 by hand to replace the one or more light sources 126. In certain embodiments, no further disassembly of the light fixture assembly 110 is required to replace, for example, the one or more light sources 126.

In certain embodiments, the lens module 114 prevents movement of the lens 136 relative to the one or more light sources 126 and the socket 118 so that the lens module 114 including the lens 136, the one or more light sources 126, and the socket 118 can be manipulated by a user as a single piece. For example, in certain embodiments, the lens module 114 includes the one or more light sources 126, the lens 136, and the socket 118 having the power wire 120 as a single piece.

In certain embodiments, the one or more light sources 126 can be arranged relative to the lens module 114 to emit light in a direction towards the opening 116 of the housing 112 when the lens module 114 is in the installed position. In certain embodiments, the one or more light sources 126 can receive electrical power through the socket 118 when the one or more pins 128 of the one or more light sources 126 are electrically connected to the one or more contacts 122.

In certain embodiments, the one or more light sources 126 can be operated by a switch, a remote control, or any other suitable controller. In some embodiments, the light source 126 can be operated by a lighting controller as disclosed in U.S. Pat. No. 9,295,170 issued Mar. 22, 2016, a circuit board and controller that can control at least one of dimming, zoning, and lighting as disclosed in U.S. Pat. No. 9,521,725 issued Dec. 13, 2016, and U.S. patent application publication No. 2017/0127493 filed Jan. 12, 2017. All of which list Woytowitz as an inventor and are assigned to Hunter Industries, Inc., the assignee of the current application.

Figure 14:
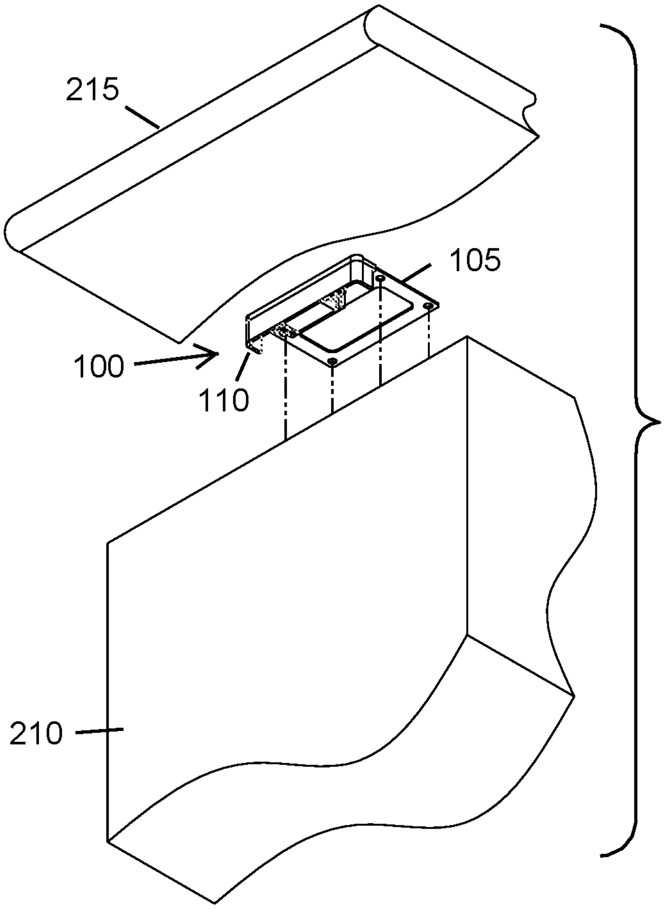
FIG. 14 is a perspective view showing the mounting plate of the light assembly of FIG. 1 aligned between a riser and a cap prior to installation of the cap.
Figure 15:
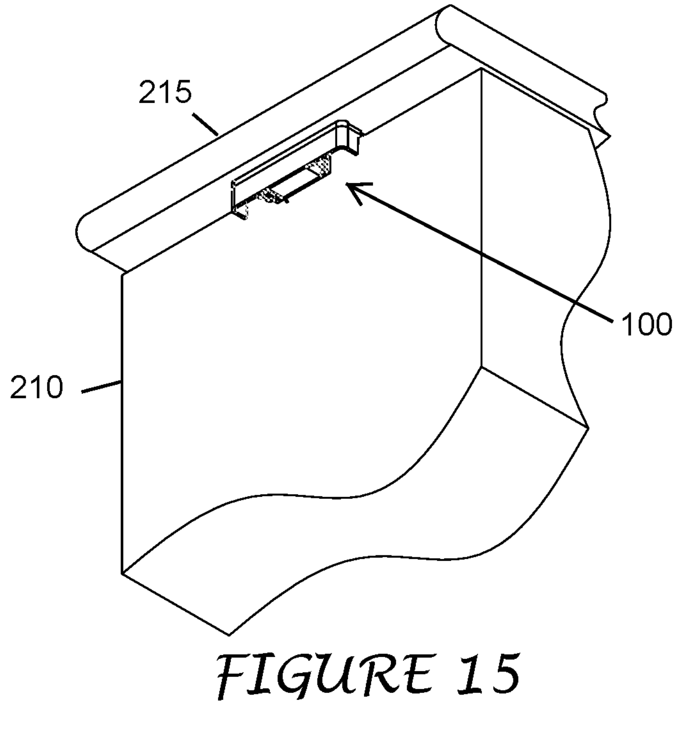
FIG. 15 is a perspective view similar to FIG. 14 except the cap has been installed over the mounting plate.

FIG. 14 is a perspective view showing the mounting plate 105 of the light assembly 100 of FIG. 1 being aligned between a riser 210 and a cap 215 prior to installation of the cap 215. FIG. 15 is a perspective view similar to FIG. 14 except the cap 215 has been installed over the mounting plate 105. The light installation can include the riser 210 and the cap 215. The riser 210 and the cap 215 may be part of a step, a stair, a wall, or any other suitable structure.

The riser 210 can be positioned superior to a base. The base can be a ground surface, a floor surface, a platform, or any other suitable surface. In certain embodiments, the base can be formed of concrete. In certain embodiments, the base can be formed of soil. In certain embodiments, the base can provide structural support to the riser 210 and/or cap 215.

In certain embodiments, the riser 210 can rest on a top surface of base. In certain embodiments, the riser 210 can extend superiorly from the base towards the cap 215. In certain embodiments, the riser 210 can be structurally supported by the base. In certain embodiments, the riser 210 can be formed of concrete, cinder block, brick, wood, plastic, or any other suitable material. In certain embodiments, the riser 210 can provide structural support to the cap 215.

The cap 215 can be positioned superior to the riser 210. In certain embodiments, the cap 215 can rest on a top surface of the riser 210. In certain embodiments, the cap 215 can extend laterally beyond at least one edge of the riser 210. In certain embodiments, the cap 215 can be formed of stone, brick, concrete, wood, composite, or any other suitable material.

In certain embodiments, at least a portion of the light assembly 100 can be installed between the riser 210 and the cap 215. In certain embodiments, the mounting plate 105 can be installed between the riser 210 and the cap 215 to secure the light assembly 100 within the installation.

In certain embodiments, the mounting plate 105 can be embedded into a layer of mortar between the riser 210 and the cap 215. For example, in certain embodiments in which the riser 210 and the cap 215 are formed of stone, brick, or concrete, the mounting plate 105 can be embedded into a layer of mortar or adhesive between the riser 210 and the cap 215. In certain embodiments, the mounting plate 105 can be embedded into a layer between the riser 210 and the cap 215 to secure the light assembly 100 within the installation.

In certain embodiments, the mounting plate 105 can be fastened to a surface of the riser 210. For example, in embodiments in which the riser 210 and cap 215 are formed of wood, such as wooden stairs, the mounting plate 105 can be fastened to a surface of the riser 210. In certain embodiments, the mounting plate 105 can be fastened to a surface of the riser 210 to secure the light assembly 100 within the installation. After the mounting plate 105 is fastened to the riser 210, the cap 215 can be installed over a top surface of the mounting plate 105.

Figure 16:
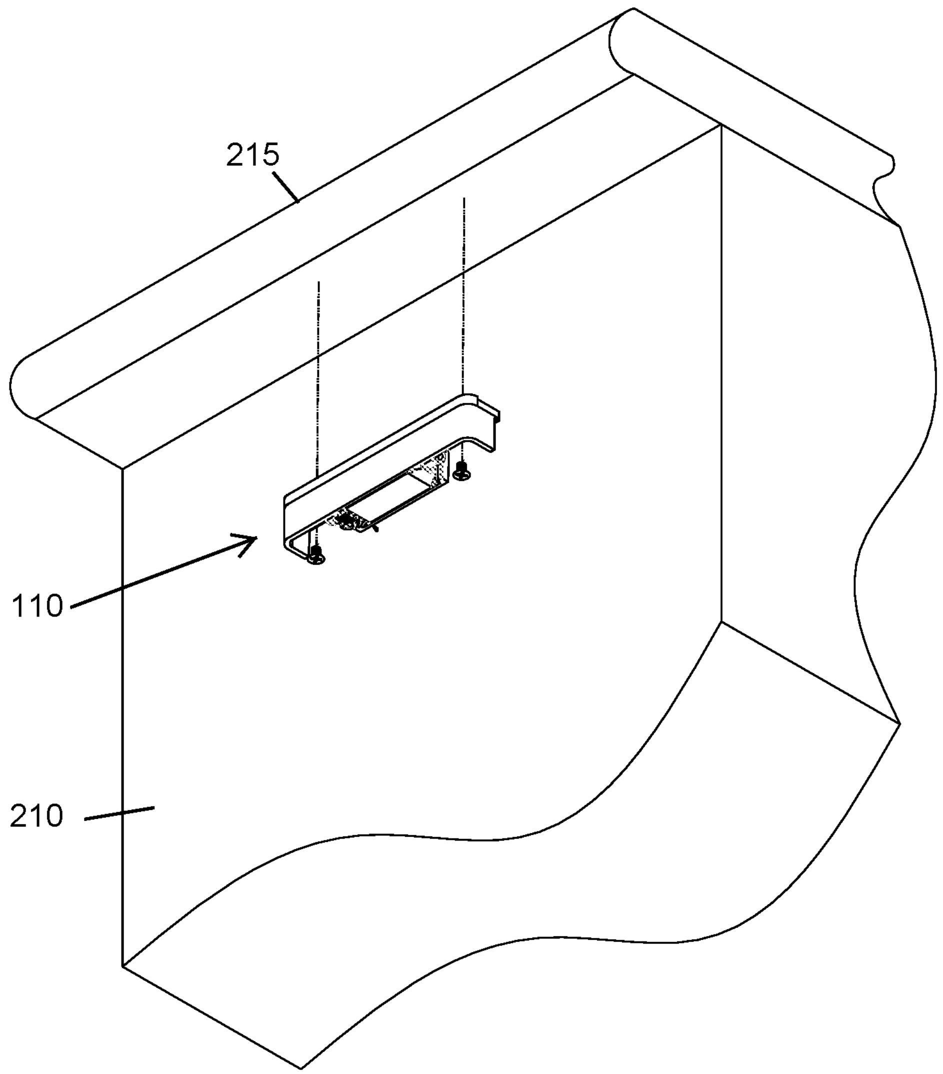
FIG. 16 is a perspective view showing the light fixture assembly of the light assembly being aligned for installation to a lower surface of the cap without utilizing the mounting plate.

FIG. 16 is a perspective view showing the light fixture assembly 110 of the light assembly 100 being aligned for installation to a lower surface of the cap 215 without utilizing the mounting plate 105. In certain embodiments, the light fixture assembly 110 is secured below the cap 215. For example, in embodiments in which the riser 210 and cap 215 are formed of wood, such as wooden stairs, the light fixture assembly 110 is secured to the lower side of the cap 215 in front of the riser 210. In certain embodiments, the light fixture assembly 110 is fastened to the cap 215 by one or more fasteners through the apertures 111 depicted in FIG. 9. For example, in embodiments in which the riser 210 and the cap 215 are formed of wood, such as wooden stairs, the light fixture assembly 110 is fastened to the cap 215 by one or more fasteners through the apertures 111. The fasteners can be screws, bolts, nuts, or any other suitable fastener.

In certain embodiments, the mounting plate 105 may be mounted to attach the light fixture assembly 110 to a face of the riser 210. In some embodiments, the mounting plate 105 may have an L-shape to facilitate mounting of the light fixture assembly 110 to the face of the riser 210.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it covers all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An outdoor light fixture assembly comprising:

a lens module sized and shaped to transition between an installed position and a removed position comprising:

a socket having at least one contact for electrically connecting to a light source, a lens positioned to emit light from the light source, and one or more end walls extending substantially perpendicular from the lens, at least one of the one or more end walls comprising a first engagement structure configured to deflect; and a housing forming a receptable having an opening to receive the lens module and a second engagement structure that engages the first engagement structure when the lens module is in the installed position, wherein deflection of the at least one of the one or more end walls deflects the first engagement structure away from the second engagement structure as the lens module transitions to the removed position.

2. The outdoor light fixture assembly of claim 1, wherein the lens module is configured to transition between the installed and removed positions without the use of tools.

3. The outdoor light fixture assembly of claim 1, wherein the lens module is configured to be manipulated by the user as a single piece.

4. The outdoor light fixture assembly of claim 1, wherein one of the first engagement structure or the second engagement structure comprises a hook.

5. The outdoor light fixture assembly of claim 1, wherein one of the first engagement structure or the second engagement structure comprises a lip.

6. An outdoor light fixture assembly configured to be supported by a step or cap via a mounting plate, the light fixture assembly comprising:

a housing configured to be supported by the mounting plate, the housing having a first engagement structure and forming a receptacle having an opening; and a user serviceable lens module being sized and shaped to transition between an installed position and a removed position relative to the housing, the user serviceable lens module being disposed in the receptacle and covering the opening so as to restrict water from entering the receptacle through the opening when in the installed position, the user serviceable lens module supporting a socket, a lens, and one or more end walls extending substantially perpendicular from the lens, at least one of the one or more end walls comprising a second engagement structure, the socket having a power wire and at least one contact for electrically connecting to one or more light sources, the socket being disposed relative to the user serviceable lens module such that the at least one contact is accessible from inside the user serviceable lens module and at least a portion of the power wire is disposed outside the user serviceable lens module, the power wire being configured to electrically connect with a source of electric power, the lens being positioned so that light emitted by the one or more light sources exits the receptacle through the lens, the second engagement structure being complementary to the first engagement structure so as to allow the user serviceable lens module to be transitioned from the installed position to the removed position, wherein deflection of the at least one of the one or more end walls deflects the first engagement structure away from the second engagement structure as the user serviceable lens module transitions to the removed position.

7. The outdoor light fixture assembly of claim 6, wherein the at least one contact is recessed within one or more channels in the socket.

8. The outdoor light fixture assembly of claim 6, wherein the user serviceable lens module is configured to transition between the installed and removed positions without the use of tools.

9. The outdoor light fixture assembly of claim 6, wherein the first engagement structure comprises a lip.

10. The outdoor light fixture assembly of claim 6, wherein the second engagement structure comprises a hook.

11. The outdoor light fixture assembly of claim 6, wherein the receptacle is U-shaped.

12. The outdoor light fixture assembly of claim 6, wherein the user serviceable lens module further comprises a channel sized and shaped to receive the socket.

13. The outdoor light fixture assembly of claim 6, wherein the user serviceable lens module further comprises a boss, at least a portion of the boss being sized and shaped to fit within a portion of the opening.

14. The outdoor light fixture assembly of claim 6, wherein the user serviceable lens module further comprises the one or more light sources.

15. An outdoor light fixture assembly comprising:

a housing having a first engagement structure and forming a receptacle having an opening; and a lens module sized and shaped to transition between an installed position and a removed position relative to the housing, the lens module being disposed in the receptacle and covering the opening so as to restrict water from entering the receptacle through the opening when in the installed position, the lens module comprising:

a socket having a power wire and at least one contact for electrically connecting to one or more light sources, the socket being disposed relative to the lens module such that the at least one contact is accessible from inside the lens module and at least a portion of the power wire is disposed outside the lens module, the power wire being configured to electrically connect with a source of electric power, a lens positioned so that light emitted by the one or more light sources exits the receptacle through the lens, and one or more end walls extending substantially perpendicular from the lens, at least one of the one or more end walls comprising a second engagement structure complementary to the first engagement structure so as to allow the lens module to be transitioned from an installed position to a removed position, wherein deflection of the at least one of the one or more end walls deflects the first engagement structure away from the second engagement structure as the lens module transitions to the removed position.

16. The outdoor light fixture assembly of claim 15, wherein the lens module is configured to transition from the removed position to the installed position by pushing the lens module against the housing.

17. The outdoor light fixture assembly of claim 15, wherein the receptacle is U-shaped.

18. The outdoor light fixture assembly of claim 15, wherein the first engagement structure comprises a lip.

19. The outdoor light fixture assembly of claim 15, wherein the second engagement structure comprises a hook.

20. The outdoor light fixture assembly of claim 15, wherein the lens module is configured to transition between the installed and removed positions without the use of tools.

* * * * *